(12) United States Patent
Stern

(10) Patent No.: US 6,625,448 B1
(45) Date of Patent: Sep. 23, 2003

(54) ACOUSTIC TESTING SYSTEM AND METHOD FOR COMMUNICATIONS DEVICES

(75) Inventor: Trampas B. Stern, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/432,702

(22) Filed: Nov. 2, 1999

(51) Int. Cl.[7] ................................................ H01Q 7/20
(52) U.S. Cl. ...................... 455/425; 455/423; 455/424; 455/67.1; 379/410; 379/420; 381/59
(58) Field of Search .............................. 455/423, 424, 455/425, 67.1; 379/410, 420; 381/59

(56) References Cited

U.S. PATENT DOCUMENTS

| | | | | |
|---|---|---|---|---|
| 5,031,204 A | * | 7/1991 | McKernan | 455/560 |
| 5,425,076 A | * | 6/1995 | Knippelmier | 379/27.04 |
| 5,764,726 A | * | 6/1998 | Selig et al. | 379/21 |
| 5,884,159 A | * | 3/1999 | Thro et al. | 455/412 |
| 5,933,776 A | * | 8/1999 | Kirkpatrick | 455/423 |
| 5,950,123 A | * | 9/1999 | Schwelb et al. | 455/414 |
| 5,987,320 A | * | 11/1999 | Bobick | 455/423 |
| 6,035,046 A | * | 3/2000 | Cheng et al. | 381/59 |
| 6,125,275 A | * | 9/2000 | Comer et al. | 455/426 |
| 6,304,753 B1 | * | 10/2001 | Hartmaier | 455/413 |
| 6,330,428 B1 | * | 12/2001 | Lewis et al. | 455/423 |

\* cited by examiner

Primary Examiner—William Trost
Assistant Examiner—Sharad Rampuria
(74) Attorney, Agent, or Firm—Coats & Bennett, P.L.L.C.

(57) ABSTRACT

The present invention includes a system for testing the acoustical performance of a cellular communication system and includes a field unit such as a cellular phone that can both send and receive signals to and from a base station. The base station is connected to a testing computer via digital communication lines for transmitting the test data. The system prevents the signal between the base station and the testing computer from being transferred through an analog central office that may cause unknown noise to be inadvertently included within the signal and prevent accurate testing and calibration of the communication system. Audio messages may be sent from the field unit to the testing computer for testing, or the audio messages may originate at the testing computer and then sent to the field unit. The system further provides for results from the testing to be sent to a technician at the field unit to allow for evaluating and making any changes within the communication system.

29 Claims, 7 Drawing Sheets

ACOUSTIC TESTING SYSTEM AND METHOD FOR COMMUNICATIONS DEVICES

BACKGROUND OF THE INVENTION

The present invention is directed to a method and system for testing the acoustical performance of a communication system and, more particularly, to a method and system that allows a user to obtain audio test results at a remote location.

One of the problems of testing communication devices, such as cellular phones, and landline phones, is how to test the acoustics in a realistic environment. Many systems that are tested in a controlled environment with controlled conditions may not perform the same once placed in use. A device that operated well during laboratory testing may be unacceptable once exposed to a realistic environment. Thus, it is important for the device to be tested in the same environment as it will be used by a customer, and on a live system, to ensure the device is working properly and the sound quality is acceptable.

One method for testing the acoustics of the system is through the use of a static recording and playback device. The device is similar to an answering machine and allows a technician to call a number from the field and have known audio played through the test unit. The technician records the resulting audio in the field for later analysis. One problem with this approach is that the technician cannot obtain test results while out in the field. To secure results, the technician must return to the lab in order to check the audio test results. If the results are inadequate, the technician must return to the field to make appropriate adjustments and verify the new results with a new test. Obviously, this becomes especially burdensome when the technician cannot readily return to the lab to analyze the audio results.

Another drawback to the conventional testing approach is the variability of the communication link between the field unit and processing site. The communications may be routed through a central office and public switched telephone network. As such, different analog switches may be used to route calls by the central office each time a call is made, adding unknown and inconsistent noise variations to the call. These variations cannot be accounted for during the testing of the audio levels and result in inaccurate or inconsistent test results.

Thus there remains a need for a means to test equipment within a communication system from a remote location and obtain the test results while at the remote location.

SUMMARY OF THE INVENTION

The present invention is directed to a system for testing the acoustical performance of a cellular communication system. The system allows a technician in the field to perform acoustical testing on the various components of the communication system, and to receive the results of the testing while remaining in the field. This system also allows the technician to make any necessary alterations while in the field without returning to a home base to retrieve test results.

The system includes a field unit such as a cellular phone that can both send and receive signals to and from a base station. A fixed station, such as a testing computer, is connected to the base station with digital communication lines.

According to the present invention, a known audio signal is sent from the field unit to the testing computer for testing. The signal is sent from the field unit, to the base station, and then routed via a network to the testing computer. Tests are performed on the received signal at the testing computer and compared to the known signal sent from the field unit to determine any signal loss or distortion. The results calculated at the testing computer are then transmitted to the field unit either directly through an audio link, short message service, or indirectly through an e-mail server so that the results are available to the technician in the field. The technician can then review the results and make the necessary corrections without returning from the field to view the test results.

Another testing method is for the technician from the mobile terminal in the field to contact the testing computer and receive an audio message played back by the testing unit. The testing computer has stored audio tracks that are selected and transmitted through the base station to the field unit. Again because the audio parameters of the signal were known at the testing computer, the results received at the field unit can be compared and any necessary changes made.

DESCRIPTION OF THE PREFERRED EMBODIMENTS

Figure 1:
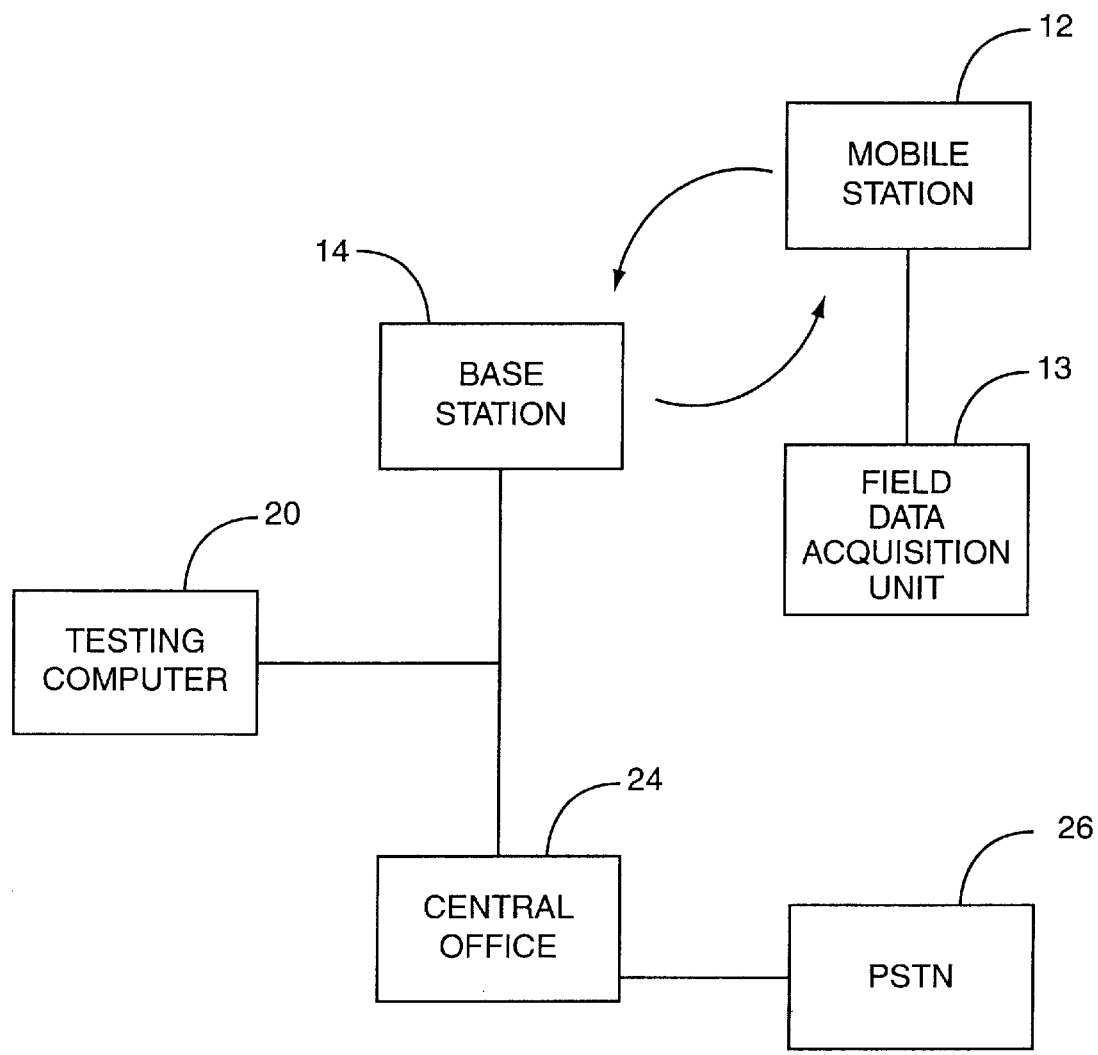
FIG. 1 is a schematic diagram of the components of the present invention including a mobile terminal, field data acquisition unit, base station, and testing computer.

Referring now to the drawings and, particularly to FIG. 1, the acoustical testing system of the present invention is illustrated therein and indicated generally by the numeral 10. The testing system 10 includes a mobile terminal 12, a field data acquisition unit 13, a base station 14, and a testing unit 20. The mobile terminal 12 receives and transmits signals to the base station 14 for communicating with other mobile terminals and landline phones. The testing unit 20 is accessible to the base station 14 allowing the mobile terminal 12 and field data acquisition unit 13 to access information previously stored at the testing unit 20, record information to the testing unit 20, and retrieve information from the testing unit 20, or allow the testing unit 20 to send test results to the technician via a supplied e-mail address. This system allows tests to be performed at the mobile terminal 12 by the field data acquisition unit 13 without directing communications through a central office 24 and public switched telephone network (PSTN) 26 which may be unreliable because of noise and other extraneous information added to the signal.

Figure 2:
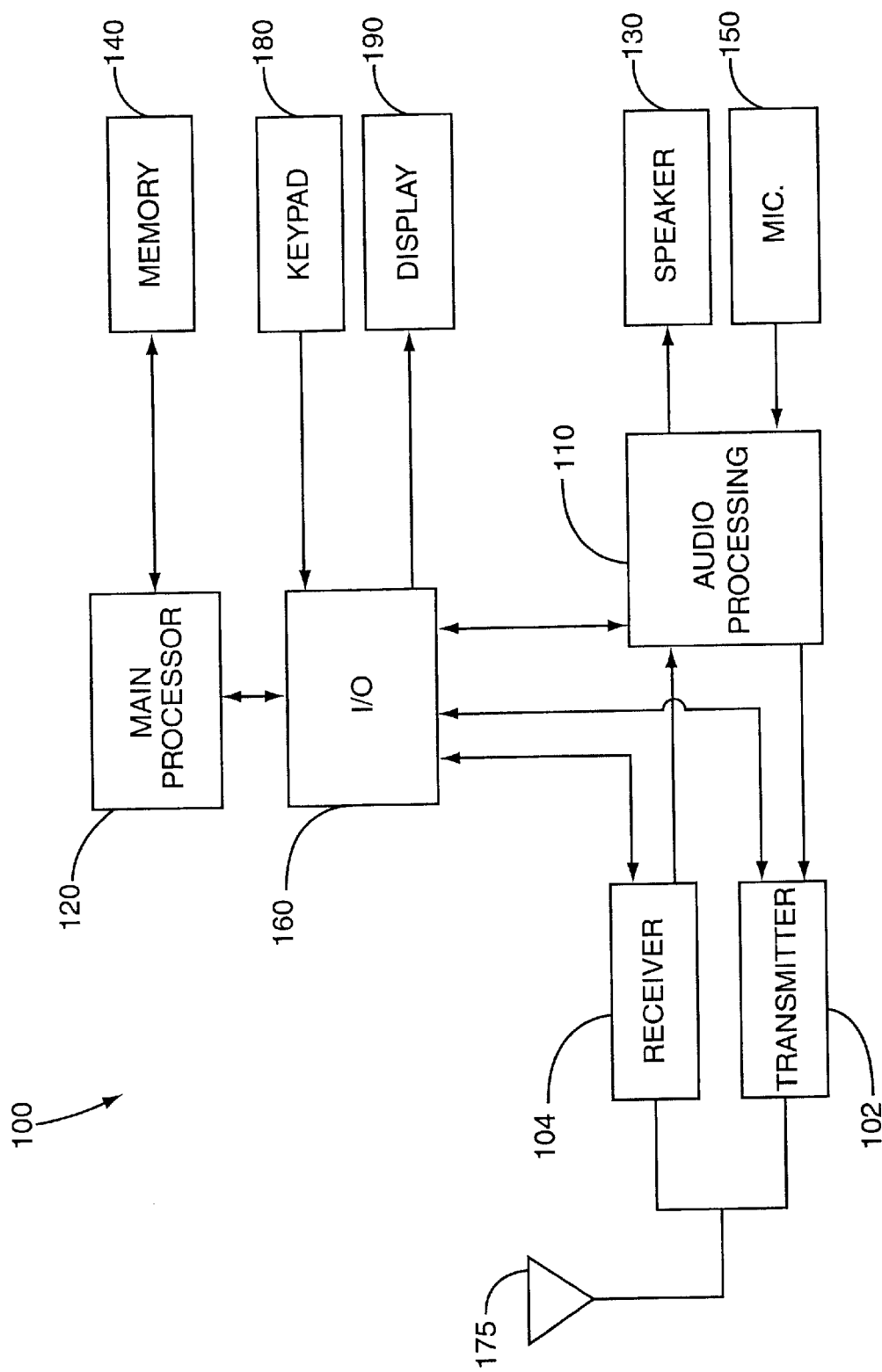
FIG. 2 is a schematic diagram of the mobile terminal.

FIG. 2 illustrates the main components of mobile terminal 12 constructed in accordance with the present invention. In this illustrative example, the mobile terminal 12 is a digital cellular mobile telephone operating according to ANSI-136.

The mobile telephone 12 includes a transmitter 102 and receiver 104 for transmitting and receiving signals over RF channels. Microprocessor 120 controls the operation of the mobile telephone according to instructions stored in memory 140. Memory 140 is also used to store data needed by the field unit as well as application programs used by the mobile telephone 12 to perform testing as described herein. Input/output circuits 160 interface the microprocessor 120 with a keypad 180, a display 190, audio processing circuits 110, receiver 104, and transmitter 102. The keypad 180 allows the user to enter data and commands. Display 190 allows the user to view messages or other information, such as test data. The audio processing circuits 110 provide basic analog audio outputs to the speaker 130 and accept analog audio inputs from the microphone 150. An antenna 175 provides for signaling the base station. The mobile terminal 12 preferably includes short message service capability that allows a user or a technician to send and receive alphanumeric messages of up to about 160 characters. The details of the construction and operation of such a mobile telephone 12 are well known in the art and need not be discussed further herein.

Figure 3:
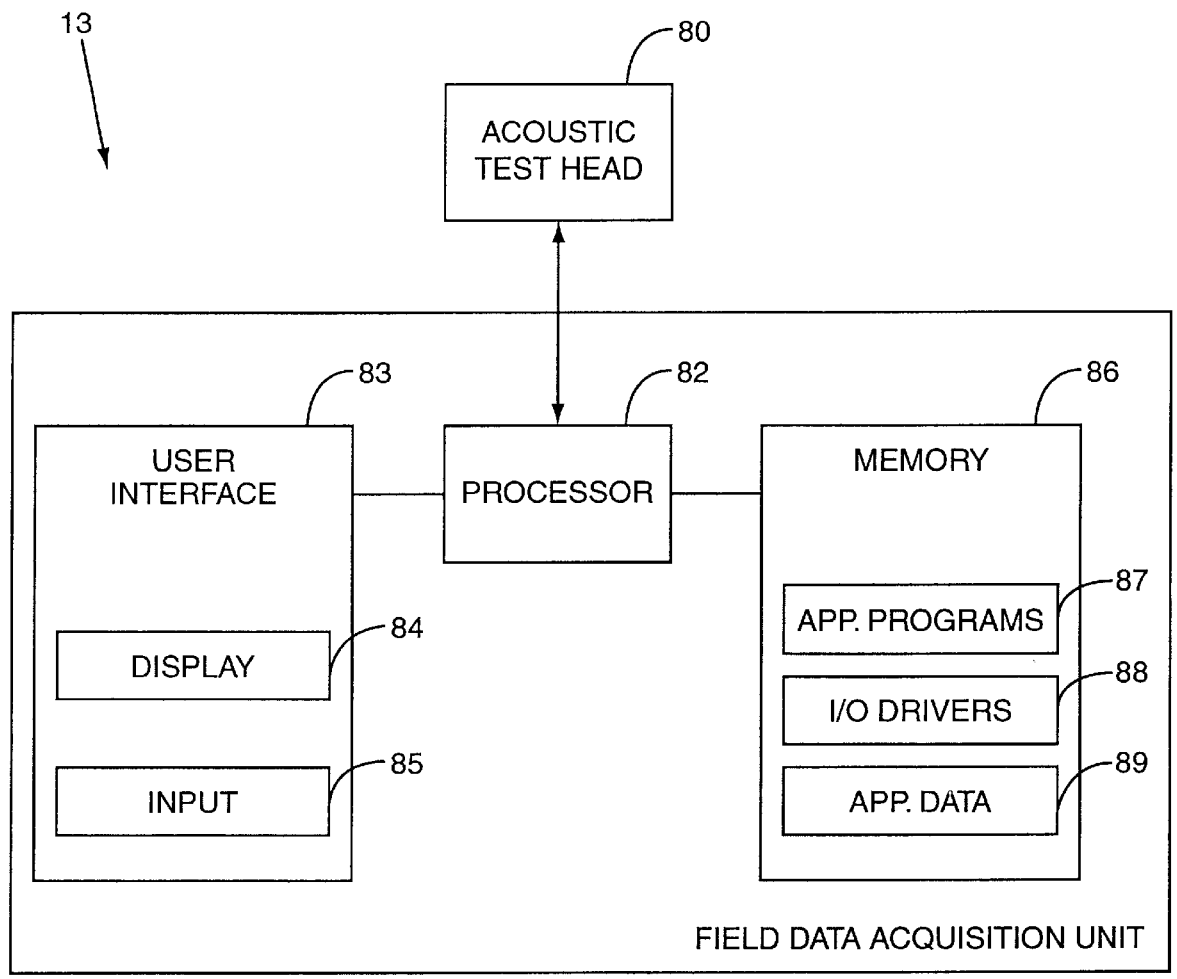
FIG. 3 is a schematic diagram of the field data acquisition unit for receiving and sending information to the testing unit.

Referring to FIG. 3, the field data acquisition unit 13 includes an acoustic test head 80, a processor 82, a user interface 83, and memory 86. The processor 82 controls the function of the field data acquisition unit 13 according to instructions stored in memory 86. Application programs 87, application data 89, and I/O drivers 88 are also stored in the memory 86. The applications programs 87 help perform the various tests for determining the acoustic parameters. The application data 89 typically includes a variety of known audio signals that are transmitted to the testing unit 20 for use in a variety of tests. Additional audio files may also be included on a removable storage medium, such as a compact disk (not shown). The input/output drivers 88 allow the processor 82 to communicate with other external devices.

The user interface 83 includes a display 84 and input 85 and provides a means for a technician to control and monitor the field data acquisition unit 13. The display 84 allows the technician to review test results and input various information that may be required by the testing unit 20. Input 85 may be any known input device such as a keyboard, pointing device, touch screen, or voice activation.

The acoustic test head 80 interfaces the mobile terminal 12 to the field data acquisition unit 13. The acoustic test head 80 includes a mounting platform conforming to the size of the mobile terminal 12 case. When the terminal 12 is mounted within the acoustic test head 80, signals received by the terminal 12 are communicated to the field data acquisition unit 13. Likewise, signals from the field data acquisition unit 13 are communicated to the terminal 12 and transmitted thereby to the testing unit 20.

As is well known in the art, the base station 14 typically includes a transceiver station and a base station controller. The base station transceiver is an interface to the communications network and includes a number of base radio transceivers coupled to an antenna assembly and power supply for sending communications to and receiving communications from various mobile terminals 12. The base station controller monitors the base station transceivers and performs frequency administration, transceiver control, and communication exchange in a manner well known in the art. While FIG. 1 illustrates a single base station in communication with the testing computer, the present invention may include any number of base stations 14 linked with the testing unit 20.

The base station 14 and testing unit 20 are preferably linked via an E1, T1, or other appropriate digital connection. An E1 line includes thirty-two time division multiplexed channels with 64 kbits/s data rate in each channel. A T1 line includes twenty-four time division multiplexed channels of 64 kbits/s data rate in each channel. It will be understood that the present invention may use other link types capable of linking elements in a multi-channel orientation and having adequate data rates. These lines provide for superior communication transfer, and minimal and predictable transfer distortions.

The central office 24 switches calls between base stations 14 and the public switched telephone network 26 (PSTN). The central office 24 includes controllers, operating program, a switching assembly, and power supply to process communication services in a manner well known in the art. The central office 24 uses physical switches, or preferably electronic switching systems, for connecting incoming and outgoing calls. The PSTN 26 includes links and systems for traditional landline communication. It is important that the signal transferred between the mobile terminal 12 and testing unit 20 not be connected via the central office 24 unless it is purely digital. This would result in each call being routed through a different analog switch making the characteristics of each call different and adding unknown variables that would skew the testing results.

Figure 4:
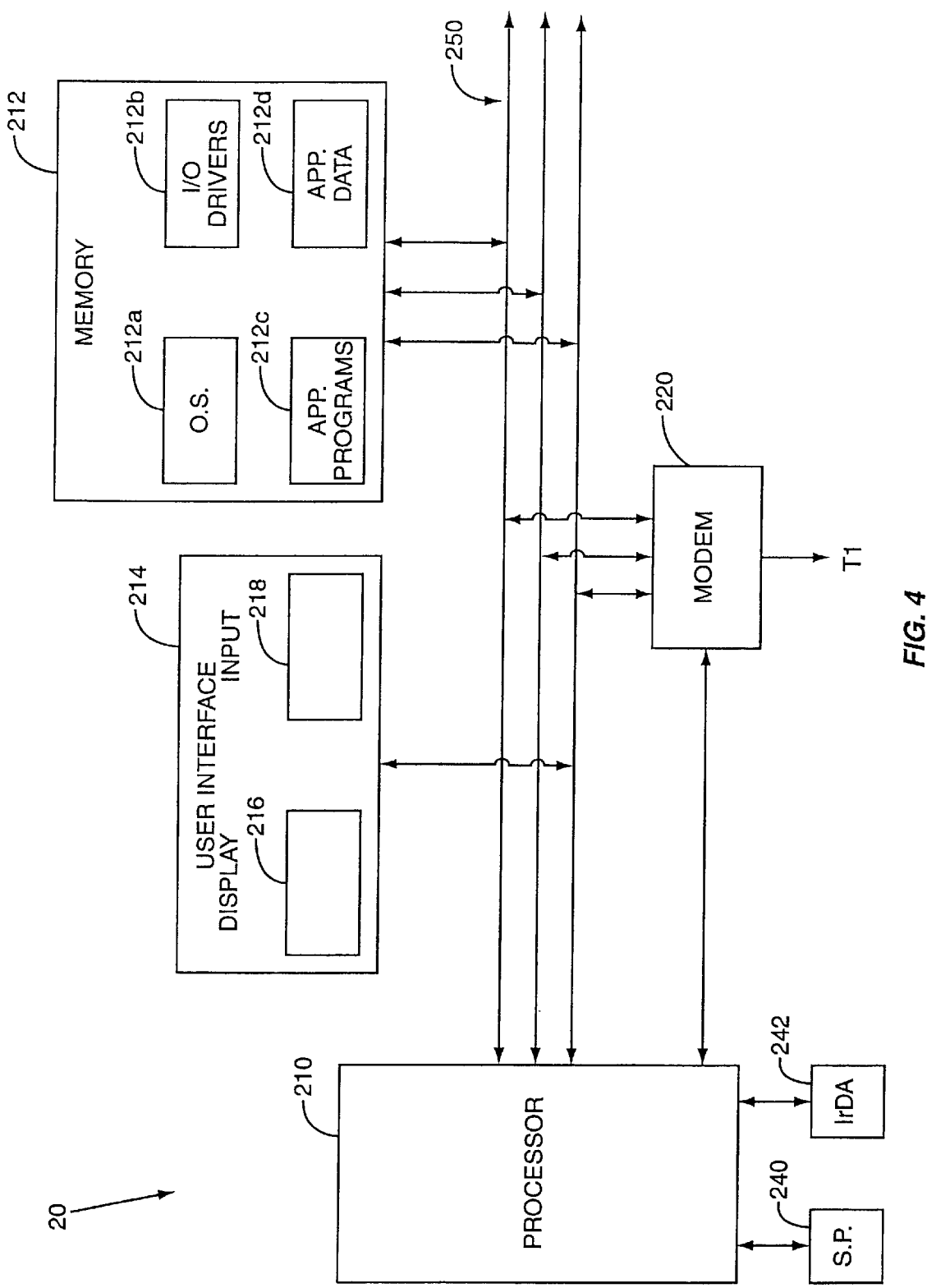
FIG. 4 is a schematic illustration of the testing unit constructed in accordance with the present invention.

The testing unit 20 sends and receives information from the mobile terminal 12. FIG. 4 illustrates the testing unit 20, which may be implemented using a general purpose programmable computer. Testing unit 20 includes a central processing unit 210, memory 212, user interface 214, and a modem 220 connected together by a system bus 250 having address, data, and control lines. The testing unit may also include infrared and serial interfaces, 240 and 242 respectively, for exchanging data with other devices.

The microprocessor 210 controls the operation of the testing unit 20 according to instructions stored in memory 212. The processor 210 can be any commercially available or custom microprocessor suitable for an embedded application, such as a Pentium III chip made by Intel. Memory 212 is representative of the overall hierarchy of memory devices containing software and data used to implement the functionality of the testing unit 20. Memory 212 can include, but is not limited to, the following types of devices: cache, ROM, PROM, EPROM, EEPROM, flash, SRAM, DRAM. As illustrated in FIG. 4, the memory 212 may hold four major categories of software and data used in the testing unit: the operating system 212a; the input/output (I/O) device drivers 212b; the application programs 212c; and the application program data 212d.

The operating system 212a may be a commercially available program such as Windows 98, Windows NT, Unix, Linux or Macintosh operating system. The operating system could also be an operating system specially designed for embedded applications. One such example of an operating system meeting these criteria is the EPOC operating system sold by Symbian Ltd., Sentinel House, 16 Harcourt St., London W1H 1DS UK, which was developed for portable hand-held computers.

The I/O drivers 212b include software routines that are accessed by the application programs 212c through the operating system 212a to communicate to other devices, such as the display 216, certain components of the memory 212, and I/O ports 240, 242.

The applications programs 212c comprise the programs that implement the various application functions of the testing unit 20. For example, the applications programs 212c include one or more testing programs to perform a variety of tests on signals received from the field unit and reporting results to the technician in the field. The testing programs may comprise one or more stand-alone components or may be a component of a larger application. The application programs 212c may also include an e-mail or FTP application to allow test results to be reported via e-mail or FTP. The email application preferably implements the messaging application programmer's interface (MAPI) developed by Microsoft Corporation, or other industry standard interface.

The static and dynamic data used by the application programs 212c is represented by the application data 212d. For example, in one embodiment of the invention, the application data includes a library of known audio files that are used by the testing application programs 212c for comparison to a received signal as will be hereinafter described, or which may be transmitted by the testing unit 20 to the mobile terminal 12. The audio files could also be stored in a removable data storage medium, such as a compact disk.

The user interface 214 includes a display 216 and a user input device 218. Display 216 enables the user to view stored information, such as test information and messages. The input device 218 may be any known input device for a computing device including without limitation a keypad, pointing device (such as a mouse, trackball, touch pad, or light pin), or touch screen. Voice activation could also be used for user input.

Modem 220 interfaces the testing unit 20 to a standard T1 or E1 line. Modem 220 preferably implements the telephone application programmer's interface (TAPI), which is an industry standard interface for telephone connections.

A speech synthesizer may be used to synthesize voice messages that can be transmitted to the technician in the field. Such a speech synthesizer preferably implements the speech application programmer's interface (SAPI) developed by Microsoft Corporation, or some other industry standard interface. A typical use of the speech synthesizer is to synthesize a message containing the results of a test that is then played back for the technician.

The present invention allows testing of the mobile terminal 12, and the base station 14. By calibrating the base station 14 and calculating the amount of expected signal loss due to the E1/T1 lines, the expected output that should be received by the mobile terminal 12 can be determined. Actual test results that differ from the expected values are then known to be a result of inaccurate parameters in the mobile terminal 12. Some signal loss between the base station 14 and the mobile terminal 12 may be caused by outside factors such as terrain, weather, foliage, etc., but these loss amounts can be included in the expected results, or are not enough to adversely effect the results.

Likewise, the base station 14 can be tested by controlling the other elements of the acoustical testing system 10. By calibrating and testing the mobile terminal 12 within laboratory conditions prior to being taken into the field, it can be assumed that any signal deviation during the testing from the expected results can be isolated to the base station 14.

Landline phones may also be tested through the present invention. A call from the landline phone is handled by digital switches within the central office 24, and connected to the testing computer 20 along digital lines.

Prior to interacting with the testing unit 20, the technician places the mobile terminal 12 within the acoustic test head 80. In this manner, the field data acquisition unit 13 may receive the audio signal with a minimal amount of additional noise and other extraneous information thereby allowing accurate testing. The technician can then perform tests while in the field on the received audio and determine the adequacy of the mobile terminal 12 and base station 14 based on the known audio parameters of the transmitted signals from the testing unit 20 against the received audio signals.

Figure 5:
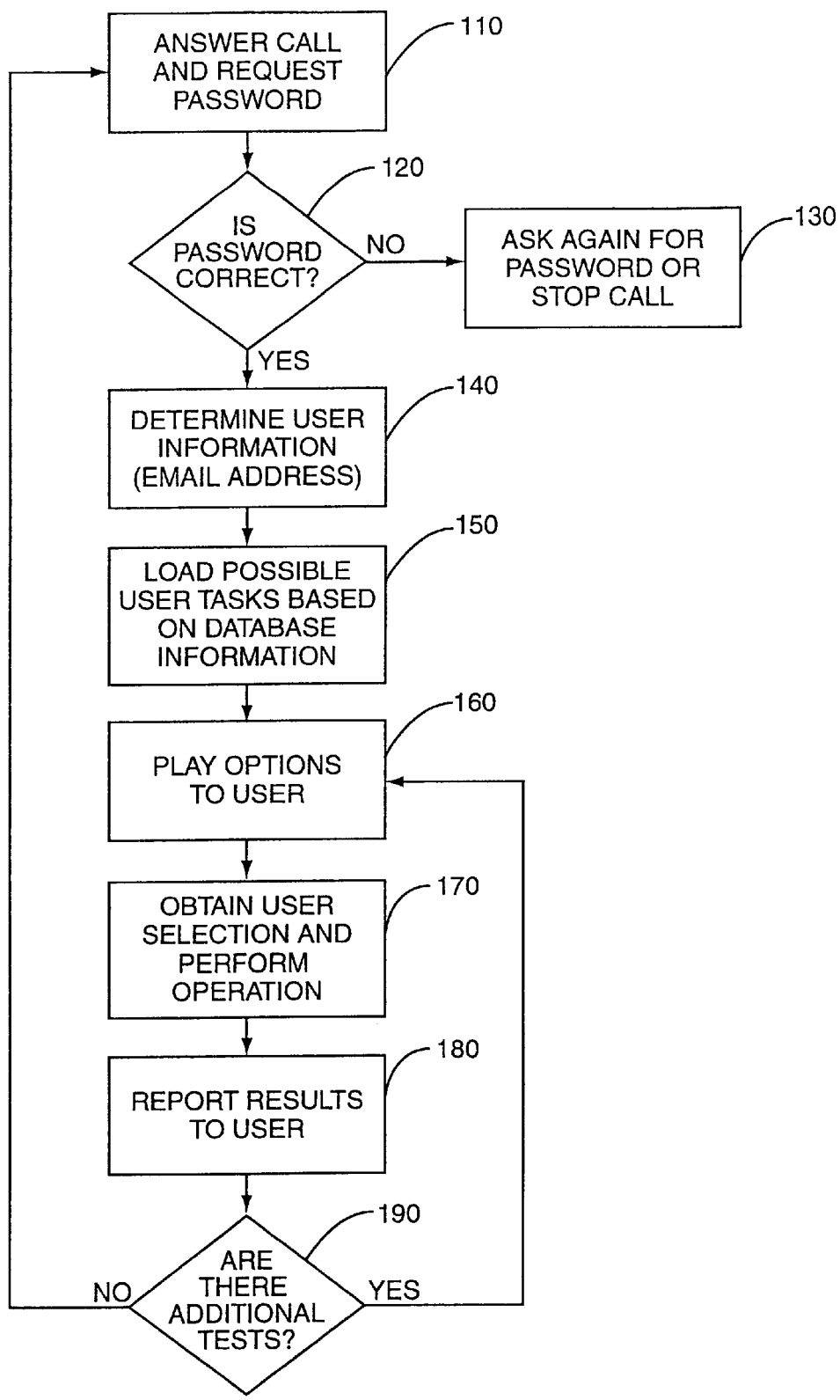
FIG. 5 is a flow diagram illustrating the steps of a technician accessing the on call software for acoustical testing.

FIG. 5 illustrates the process of a technician accessing the acoustical testing software. The first step is accessing the testing computer directly without being routed through the analog portion of the central office 24 or PSTN 26. The technician inputs a number that accesses the testing unit 20. The testing unit 20 receives the request and initially requests that a password identifier be input (block 260). If the password is not correct (block 262), the testing unit 20 may request the technician re-enter the password or may terminate the call (block 264). If the password is initially input correctly, the testing unit 20 accesses technician information from a database (block 266). As discussed more below, the technician information preferably includes the technician's e-mail address (block 266). The testing unit 20 then loads the possible test requests (block 268) and informs the technician of the different options (block 270). The technician selects from the appropriate test selections that are available for testing the mobile terminal 12 and base station 14. The testing computer receives the selection from the technician and performs the requested tests (block 272). The time to perform the tests and calculate the results may change depending upon the complexity and number of tests. The results of the tests are available to the technician upon the completion of the calculations (block 274). This allows the technician to obtain the results while still in the field and make the necessary alterations without returning to a home station to access and analyze the test results. The testing unit 20 then requests the technician indicate the manner in which the results should be reported. For example, results could be reported by audio message, short-message service, or e-mail (block 274). The results may be directly sent to the field data acquisition unit 13 or mobile terminal 12 while the technician is present to review the results, or may be sent to an e-mail address that the technician can access while in the field and retrieve the results. The technician is then prompted whether there are additional tests to be performed (block 276). If additional tests are necessary, the options are again played for the technician. If no additional tests are required, the communication session is terminated.

The testing unit 20 preferably includes a security gate for preventing non-approved users from accessing the system. The security gate requires that the technician enter a password or identification code in order to access the testing routines. The technician may input information via the keypad 180 on the mobile terminal 12, field data acquisition unit input 85, or a more sophisticated voice-recognition program may be utilized among others known in the art. The security gate helps prevent unwanted entry to the testing unit 20, and also helps organize various testing results for a single technician. By way of example, if one technician is performing tests on more than one mobile terminal 12, a separate password may be used for each test to ensure the results are segregated and the technician purposefully accesses the correct information they desire. Alternatively, the testing unit 20 may be equipped with caller ID for use as a reference indicator. A predefined list of approved numbers provides for the testing unit 20 to compare the caller, and allow access if the identification matches the approved list.

An e-mail address may also be included for transferring test results from the testing unit to the technician. Previous testing systems have a distinct disadvantage because the technician was required to perform testing from the field and then return to a home location to access the results. If additional changes were required to the mobile terminal 12 or base station 14, the technician then had to go back out into the field and make the necessary corrections. The e-mail address of the technician may be obtained during the security clearance as the testing computer matches the inputted password with a user list to identify the technician and the e-mail address. Alternatively, the technician may enter a different e-mail address for sending the test results. The technician may access the e-mail message through a separate personal computer, or the field data acquisition unit 13 may be equipped to provide for e-mail accessibility.

Figure 6:
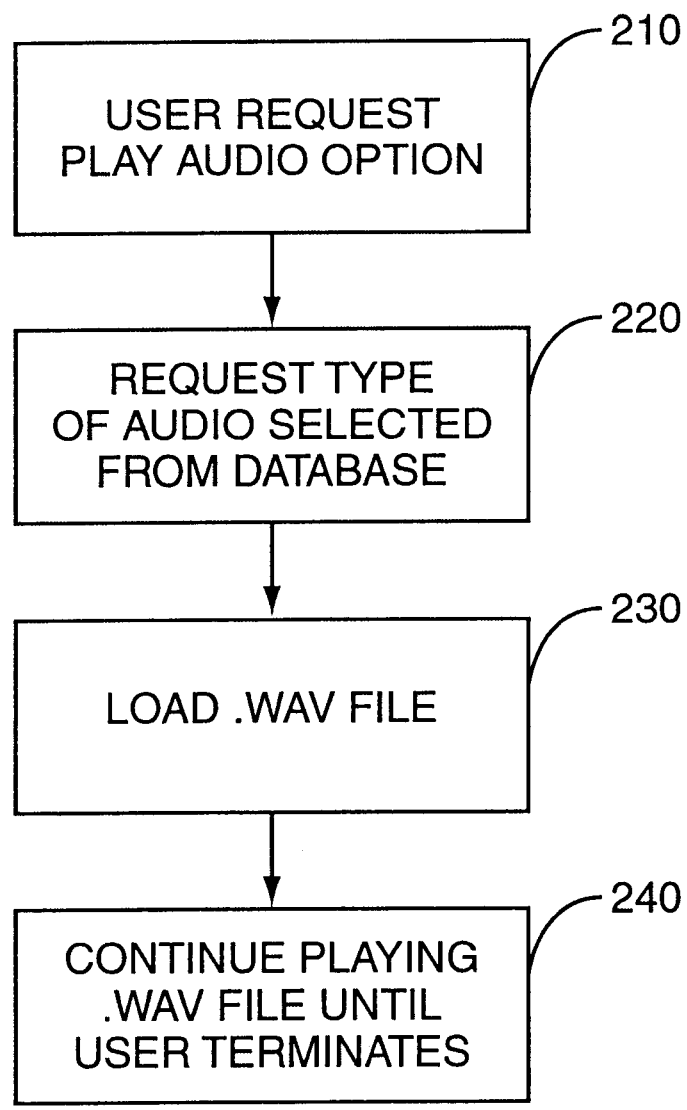
FIG. 6 is a flow diagram illustrating the steps for accessing a playback option of the present invention.

FIG. 6 illustrates the playback option to receive audio signals having known, expected audio levels at the mobile terminal 12 and field data acquisition unit 13. At block 272 from the logic illustrated in FIG. 5, the technician identifies the appropriate play audio test (block 280) and selects the specific type of audio file to be played by the testing unit 20 (block 282). The selection is from a list of audio files that are stored within the testing computer memory 212, or within the removable data storage medium, at the testing unit 20. The testing unit 20 loads and plays the selected audio file and transmits the signal to the mobile terminal 20 (block 284). The audio file is preferably continually played for testing at the mobile terminal 12 and field data acquisition unit 13 until the technician terminates the test (block 286), usually by pressing a specified key on the mobile terminal 12.

Figure 7:
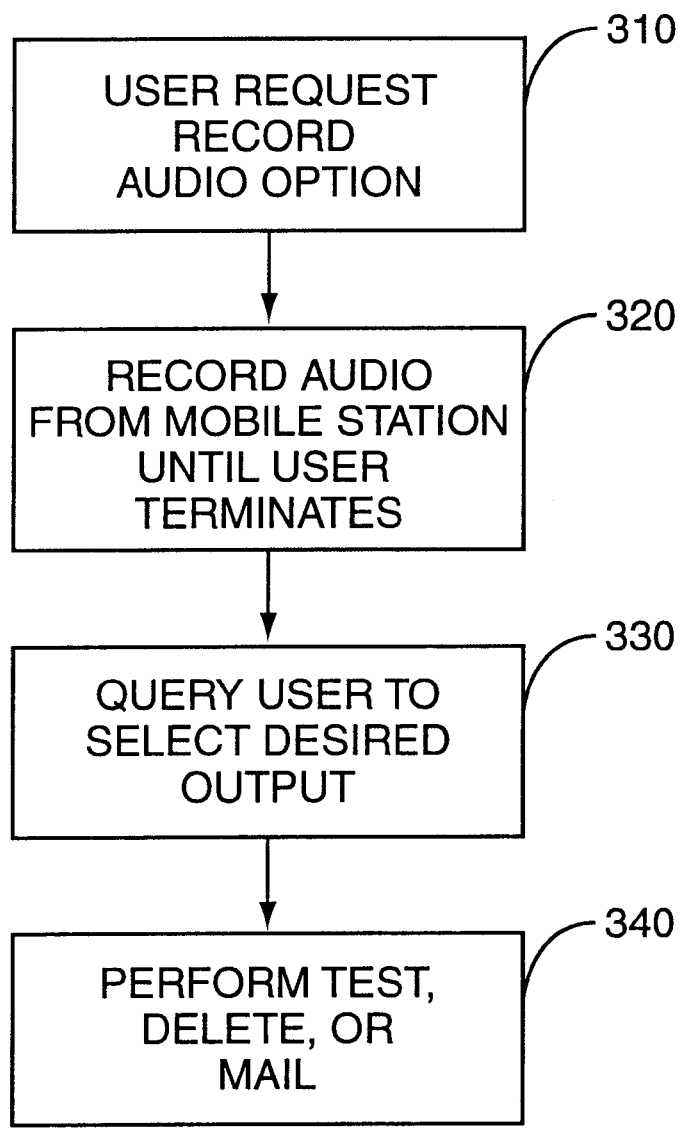
FIG. 7 is a flow diagram illustrating the steps for accessing the record audio option.

FIG. 7 illustrates a record option for the technician to transmit an audio signal to the testing unit 20 (block 310). The technician places the mobile terminal 12 within the field data acquisition unit 13 and notifies the testing unit 20 that the technician is requesting a record audio test (block 310). The mobile terminal 12, or the field data acquisition unit 13 via the mobile terminal 12, transmits a known audio signal that is stored at the testing unit 20. The testing unit 20 records the audio signal for a given duration or until the signal is terminated by the technician (block 320). The testing unit 20 then queries the technician to select the desired output (block 330). The technician may select the test results be sent via e-mail to the technician's account, deleted, or communicated via an audio format (block 340).

Additional tests of the base station 14 and mobile terminal 12 may be performed without knowing the input values of the audio signals. The technician may enter audio signals that are received by the testing unit 20 for tests including speech loudness (ITU specification P.56). Another test determines the bumble bee noise from the mobile terminal by measuring the power spectrum of the 217 Hz harmonics (GSM) or the 50 Hz harmonics (TDMA).

Another test includes measuring the far end echo from the testing unit 20. The testing unit 20 plays a loud speech burst while recording the up-link audio. By performing a cross correlation, the time delay in the echo can be determined. Then using a time selective response, the echo level can be determined.

Additional tests that can be performed without knowing the input audio include speech quality measurements, idle channel noise, and pops and clicks and other spurious noises.

The field data acquisition unit 13 may also play a form of artificial speech into the mobile terminal 12 that is received at the testing unit 20 (ITU specification P.52). By entering the level that was being playing into the mobile terminal 12, the testing unit 20 can determine a loudness rating. This information is helpful in determining the base station gain settings.

Although the examples illustrated the use of a wireless communications device, the present invention may also be used for testing landline phones. The technician connects to the testing computer 20 through digital switches within the central office 24 and digital lines between the central office 24 and testing computer 20. Messages between the testing computer 20 and the technician at the landline phone may be transferred similar to those described above.

In the foregoing description, like reference characters designate like or corresponding parts throughout the Figures. Also in the foregoing description, terms such as "forward", "backward", "left", "right", "upwardly", "downwardly", and the like are words of convenience and are not to be construed as limiting terms. Certain modifications and improvements will occur to those skilled in the art upon a reading of the foregoing description. The present invention may be used to test other types of wireless communications devices including two-way radios. It should be understood that all such modifications and improvements have been deleted herein for the sake of conciseness and readability but are properly within the scope of the following claims.

What is claimed is:

1. A method of testing acoustical characteristics of a communication system in a field location, the method comprising the steps of:

establishing a connection between a mobile communication device and a testing unit residing at a fixed location remote from said mobile communication device over the communication system, said connection having a connection path that includes a wireless link and excludes the Public Switched Telephone Network;

transmitting an audio signal having at least one known audio parameter over said connection from the communication device in the field location and receiving the audio signal at the testing unit;

testing the audio signal at the testing unit; and sending the test results to a technician in the field location.

2. The method of claim 1, further including remotely controlling the testing unit from the communication device.

3. The method of claim 1, further including identifying the technician making the connection through a password input by the technician.

4. The method of claim 1, wherein the test results are sent to an e-mail address of the technician.

5. The method of claim 4, wherein the technician's e-mail address is determined when the technician initially connects to the testing computer.

6. The method of claim 1, wherein the parameters of the audio signal transmitted are known values that are compared to the results received by the testing unit.

7. The method of claim 1, wherein the communication device includes a receiver and transmitter for receiving and sending messages.

8. The method of claim 7, wherein the test results are sent to the communication device and received by a short message service that displays the message on a display screen.

9. The method of claim 7, wherein the test results are sent from the testing unit to the communication device via an audio format.

10. The method of claim 1, wherein the test results are sent on a realtime basis by the testing unit.

11. The method of claim 1, wherein an artificial speech is transmitted to the testing unit for determining a loudness rating.

12. The method of claim 1, wherein testing is performed for determining an audio power spectrum.

13. A method of testing the acoustical performance of a communication system comprising the steps of:

establishing a connection between a mobile communication device and a testing unit residing at a fixed location remote from the mobile communication device, said connection having a connection path that includes a wireless link and excludes the Public Switched Telephone Network;

remotely selecting from the mobile communication device at least one audio recording stored at the testing unit;

transmitting the at least one audio recording from the testing unit to the mobile communication device over said connection, each of the at least one audio recording having at least one known acoustical output; and comparing the known acoustical output sent from the testing unit to the received values at the mobile communications device.

14. The method of claim 13, further including identifying a technician of the mobile communication device prior to establishing the connection between the mobile communication device and the testing unit.

15. The method of claim 13, wherein the audio recordings are stored at the testing unit on a compact disc.

16. The method of claim 13, wherein the audio recordings are stored at the testing unit on a hard drive.

17. The method of claim 13, wherein the technician determines a test and the testing unit determines the audio recording that are transmitted based on the test.

18. The method of claim 13, wherein the communications device is calibrated prior to performing the testing and variations between the sent and received audio recordings are a result of a base station.

19. The method of claim 13, wherein a base station is calibrated prior to performing the testing and variations between the sent and received audio recordings result from the mobile communications device.

20. The method of claim 13, wherein the testing unit and the communication device are connected via a digital line.

21. The method of claim 13, wherein at least two communication devices access audio recordings from the testing computer.

22. A method of testing the acoustical performance of a cellular mobile communication system comprising the steps of:

transmitting an audio message having known audio parameters from a cellular phone;

receiving the message from the cellular phone at a base station;

transmitting the message from the base station along a communication path to a testing unit residing at a fixed location remote from said cellular phone, said communication path excluding the Public Switched Telephone Network;

receiving and testing the message at the testing unit by comparing the known audio parameters of the transmitted audio message with the audio parameters of the received audio signal; and sending test results to a technician.

23. The method of claim 22, wherein the testing unit includes a telephone application interface for receiving and sending messages from the cellular phone.

24. The method of claim 22, wherein the testing unit includes a mail message applications programmers interface for sending email test results to the technician.

25. The method of claim 22, wherein the testing unit includes a speech applications programmers interface for sending the test results to the technician in an audio format.

26. A method of testing the acoustical performance of a wireless communication system comprising the steps of:

contacting a testing unit from a remotely located mobile terminal, said testing unit residing at a fixed location remote from said mobile terminal;

instructing the testing unit to transmit an audio message having known audio parameters to the mobile terminal;

receiving the audio message from the testing unit at the mobile terminal via a communications path that excludes the Public Switched Telephone Network; and testing the acoustical performance of the wireless communication system by comparing audio message received by the mobile terminal against the known audio parameters of the audio message transmitted by the testing unit.

27. The method of claim 26, wherein the testing unit includes a telephone application interface for receiving and sending messages with the mobile terminal.

28. The method of claim 26, wherein the testing unit includes a mail message applications programmers interface for sending email to a technician.

29. The method of claim 26, wherein the testing unit includes a speech applications programmers interface for sending audio transmissions to the technician in an audio format.

* * * * *